United States Patent [19]

Dankworth et al.

[11] 4,288,340

[45] *Sep. 8, 1981

[54] GRANULATED COMPOSITION COMPRISING A POLYMER PHOSPHATE AND AN ALKALI METAL ALUMINUM SILICATE, PROCESS OF MAKING AND METHOD OF USING SAME

[75] Inventors: Juergen Dankworth, Bensheim; Helmut Hartenstein, Ruelzheim; Ludwig Hertling, Biblis, all of Fed. Rep. of Germany

[73] Assignee: Joh. A. Benckiser GmbH, Ludwigshafen am Rhein, Fed. Rep. of Germany

[*] Notice: The portion of the term of this patent subsequent to Oct. 16, 1996, has been disclaimed.

[21] Appl. No.: 947,643

[22] Filed: Oct. 2, 1978

Related U.S. Application Data

[63] Continuation-in-part of Ser. No. 892,209, Mar. 31, 1978, Pat. No. 4,171,277.

[30] Foreign Application Priority Data

Oct. 5, 1977 [DE] Fed. Rep. of Germany ....... 2744773

[51] Int. Cl.³ .................. C01B 33/28; C02B 1/42; C11D 3/12; C11D 11/00
[52] U.S. Cl. ..................... 252/99; 23/313 R; 23/313 AS; 252/135; 252/140; 252/174; 252/174.13; 252/174.14; 252/174.21; 252/174.25; 252/179; 264/117
[58] Field of Search .................. 252/135, 140, 174.25, 252/179, 174, 99; 23/313 R; 264/117

[56] References Cited

U.S. PATENT DOCUMENTS

| | | | |
|---|---|---|---|
| 2,568,110 | 9/1951 | Beiley | 252/135 |
| 4,096,081 | 6/1978 | Phenicie | 252/174.25 |
| 4,113,644 | 9/1978 | Ashcraft | 252/91 |
| 4,171,277 | 10/1979 | Dankworth | 252/99 |

FOREIGN PATENT DOCUMENTS

| | | | |
|---|---|---|---|
| 2543976 | 4/1976 | Fed. Rep. of Germany | 252/140 |
| 2736903 | 2/1978 | Fed. Rep. of Germany | 252/140 |
| 1503356 | 3/1978 | United Kingdom | 252/140 |

*Primary Examiner*—Dennis L. Albrecht
*Attorney, Agent, or Firm*—Schwartz, Jeffery, Schwaab, Mack, Blumenthal & Koch

[57] ABSTRACT

A non-caking and freely flowing granulated composition of high abrasion-resistance which comprises a polymer phosphate and an ion-exchanging alkali metal aluminum silicate is disclosed. At least part of the polymer phosphate in said composition is a highly condensed phosphate, preferably of a phosphorous pentoxide-content between about 64% and about 69%. Said polymer phosphate may contain sodium tripolyphosphate in an amount between about 95% and 0% by weight and preferably between 80% and 60% by weight. Such a composition may also contain a water-soluble tenside which is liquid at room temperature. The process of producing such a granulated composition comprising a highly condensed phosphate and an alkali metal aluminum silicate, comprises granulation of the mixture of polymer phosphate and alkali metal aluminum silicate by spraying water or a tenside solution thereon. The resulting granulated composition is useful as additive to washing, rinsing, and cleaning-agents, as water-softening agents, as textile-washing agents, and the like.

13 Claims, No Drawings

GRANULATED COMPOSITION COMPRISING A POLYMER PHOSPHATE AND AN ALKALI METAL ALUMINUM SILICATE, PROCESS OF MAKING AND METHOD OF USING SAME

This application is a continuation-in-part of copending application Ser. No. 892,209 filed Mar. 31, 1978, now U.S. Pat. No. 4,171,277.

BACKGROUND OF THE INVENTION

The present invention relates to a non-caking, freely flowing, non-caking, abrasion resistant, granular composition of a polymeric phosphate and an ion-exchanging silicate, to a simple and effective process of making same, and to a method of using said composition in washing, rinsing, and cleaning agents, for water softening, and for other purposes.

The requirements for a highly effective washing, rinsing, and cleaning agent to be used in washing, rinsing, and cleaning apparatus are of a highly complex nature due to the peculiarities of the dosing devices in such apparatus, for instance, in dish-washing machines. In order to avoid agglomeration, caking, or lump-formation of the cleaning composition in the dosing- or measuring-chamber and to always assure fully satisfactory flushing or rinsing out of the cleaning agent, the latter is usually employed in the form of a granular composition.

The known washing, rinsing, and cleaning agents contain sodium tripolyphosphate as an essential component. For ecological reasons it has been suggested to replace part of said phosphate-containing builder by water-insoluble, ion-exchanging silicates and more particularly by alkali metal aluminum silicates. Such agents have been described in German Offenlegungschrift No. 2,412,837. However, using such compounds has the disadvantage that they remain in an unwetted state in water for a relatively long period of time. As a result thereof their action is considerably delayed. When using automatic washing-machines, it has been found that such cleaning-compositions are not fully utilized within the available period of time and/or that unsatisfactory washing results are achieved by the delayed setting free of said agent.

Therefore, attempts have been made to improve the wettability of the alkali metal aluminum silicates. A process of producing an ion-exchanging alkali metal aluminum silicate with a hydrophilic surface is described in German Offenlegungschrift No. 25 10 741. According to said process crystalline alkali metal aluminum silicate is intimately mixed with penta-sodium tripolyphosphate, the mixture is dried, and is comminuted.

The resulting hydrophilic powders, however, frequently do not yield satisfactory results when employed in automatic washing- and dish-rinsing-machines. They readily agglomerate in the dosing-containers, they cannot be flushed or washed out without leaving a residue, and due thereto considerable trouble is encountered during the rinsing-procedure. Granular compositions of sodium tripolyphosphate (designated hereinafter as STPP) and of alkali metal aluminum silicate (designated hereinafter as AAS), although having a well-defined granular structure, are of very limited stability and, as a result thereof, tend to form dust on mixing with additional components of the composition or during compounding. In this case the formation of substantial amounts of dust usually is accompanied by the composition being washed out poorly of the dosing-chamber.

Thus, it is of considerable importance to produce stable, abrasion resistant, non-caking, free flowing, granular compositions based on polymer phosphates and alkali metal aluminum silicates which compositions do not have the above-mentioned disadvantages.

It is also known to improve granulation by the addition of special binding-agents as disclosed in German Offenlegungsschrift No. 20 20 427. However, experiments with such binding-agents, for instance, with carboxy methyl cellulose or gum arabic, were unsuccessful when mixing an alkali metal aluminum silicate with sodium tripolyphosphate.

Furthermore, spraying of a waterglass solution upon a mixture of sodium tripolyphosphate and sodium silicate as suggested in German Offenlegungsschrift No. 2,039,584 for producing stable granular particles were also unsuccesful. It was not possible to obtain in this manner abrasion-resistant, granular compositions.

SUMMARY OF THE INVENTION

It is one object of the present invention to provide a granular composition containing a polymer phosphate and an ion-exchanging alkali metal aluminum silicate which composition is free of the disadvantages of heretofore known granular compositions of similar compositions.

Another object of the present invention is to provide a simple and effective process of producing such a granular composition containing a polymer phosphate and an ion-exchange alkali metal aluminum silicate.

A further object of the present invention is to provide a method of using such a granular composition composed of a polymer phosphate and an ion-exchanging alkali metal aluminum silicate as washing, rinsing, and cleaning agent and as water-softening agent.

In order to accomplish the foregoing objects according to the present invention, there is provided a granulated composition containing an ion-exchanging alkali metal aluminum silicate and a polymer phosphate comprising a highly condensed phosphate.

Preferably the polymer phosphate is a mixture of a highly condensed phosphate, e.g., a phosphate having a $P_2O_5$-content of between about 64 and 69%, and an alkali, preferably sodium, tripolyphosphate.

According to the present invention there is further provided a process for preparing the above granulated composition, which comprises the step of granulating a pulverulent mixture of the alkali metal aluminum silicate and the polymer phosphate by spraying with water in a granulating device.

Other objects of the present invention and advantageous features thereof will become apparent from the following detailed description of the invention.

DETAILED DESCRIPTION OF THE INVENTION

In principle the stable, abrasion resistant, full-grained, free-flowing, non-caking, granular compositions according to the present invention are characterized by the presence of a highly condensed polymer phosphate. Preferably such highly condensed phosphates correspond to the formula $$Me_{n+2}P_nO_{3n+1}$$

of a medium chain length, i.e. a polyphosphate in which n is one of the numerals 4 to about 50.

According to a preferred embodiment of the present invention, the granular compositions can contain, in addition to the highly condensed phosphate, also an alkali metal tripolyphosphate of the formula $Me_5P_3O_{10}$ and preferably sodium tripolyphosphate in the proportion of 5% to 100% by weight and preferably of 20% to 40% by weight of the highly condensed phosphate and of 95% to 0% by weight and preferably of 80% to 60% by weight of the alkali metal tripolyphosphate.

The proportion by weight of total phosphate to the alkali metal aluminum silicate is between about 20:1 to about 1:20 and preferably between about 2:1 to about 1:2.

Especially suitable highly condensed phosphates, useful in preparing granular compositions according to the present invention, are polyphosphates with a phosphorus pentoxide-content between about 64% and about 69%. These polyphosphates are used in the form of their alkali metal or ammonium salts and preferably of their sodium salts.

In order to reduce or eliminate the need of an aging-period of the fresh granulate for obtaining non-caking products, it is advantageous that the phosphates or at least one of the components of a phosphate mixture are applied in a form which is capable of rapidly binding water. This is the case if the phosphate has been pretreated in such a manner, that hexahydrate crystal nuclei are formed, which enhance the further addition of water.

Most preferably a pretreated, highly condensed phosphate and/or tripolyphosphate is used which has been subjected to a water-vapor pretreatment as described in the German Pat. No. 938 423, the disclosure of which is hereby incorporated by reference.

Good results are also obtained if the alkali tripolyphosphate is a partially hydrated alkali tripolyphosphate, in particular sodium tripolyphosphate, or an alkali, in particular sodium, tripolyphosphate, wherein the phase I content is more than 10% (the phase I form connotes the high temperature form of a tripolyphosphate and the phase II form connotes the low temperature form of a tripolyphosphate; depending on the temperature at which a tripolyphosphate is produced, the phase I content or the phase II content therein is higher).

Suitable ion-exchanging silicates are the silicates disclosed in German Offenlegungsschriften Nos. 2,412,837 and 2,510,741. The preferred alkali metal aluminum silicates are silicates of the formula

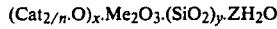

$$(Cat_{2/n}O)_x \cdot Me_2O_3 \cdot (SiO_2)_y \cdot ZH_2O$$

in which
Cat is a cation of the valency n, said cation being exchangeable against calcium;
x is a numeral between 0.7 and 1.5;
Me is boron or aluminum;
y is a numeral between 0.8 and 6.0; and
Z is a numeral between 0 and 13.5.

Especially useful have proved the alkali metal aluminum silicates known as Zeolite types A, X, and Y.

The granular compositions are produced by spraying water upon a pulverulent mixture comprising the highly condensed phosphate and the alkali metal aluminum silicate, which preferably comprises about 1 part to 20 parts by weight of an alkali metal aluminum silicate and about 20 parts to 1 part by weight of a polymer phosphate which preferably is a mixture of phosphates comprising from about 5% to 100% by weight of a highly condensed phosphate and from about 95% to 0% by weight of an alkali metal tripolyphosphate. Preferably the alkali tripolyphosphate is used in the form of a spray-dried phosphate which may be any form of alkali tripolyphosphate (phase I content above 10% or below 10% or an anhydrous form). Mixtures of various forms of phosphates may also be used, e.g., forms each containing different amounts of water of hydration. The spraying of the water upon the pulverulent mixture may be carried out in a plate-shaped granulating disc or a horizontal type of mixer, in particular a rotary tubular mixer or a spray mixer. The reaction heat generated thereby can be utilized for subsequent aging of the granular composition by retaining the same for a prolonged period of time in the granulating device. The suitable period of time during which aging of the composition takes place in order to obtain non-caking products, may vary depending on the type of phosphates used. It has been proved of advantage to subsequently dry the resulting pellets at 50° C. for about 30 minutes. It is an essential feature of the process according to the present invention that water is sprayed during granulation upon the pulverulent mixture of alkali metal aluminum silicate and highly condensed phosphate or a mixture of highly condensed phosphate with alkali metal tripolyphosphate. Only when proceeding in this manner, it is possible to produce an abrasion-resistant granulated composition. As will be shown hereinafter, no such abrasion-resistant composition is obtained when spraying, for instance, a solution of the highly condensed phosphate upon a mixture of an alkali metal aluminum silicate and tripolyphosphate.

According to a preferred embodiment of the process the granulation is carried out as follows: firstly, only a part of the highly condensed phosphate or the polymer phosphate mixture is mixed with the alkali aluminum silicate in a spray mixer whilst being sprayed with water and subsequently the remaining portion of the polymer phosphate is introduced into the mixer, preferably in pretreated form, and mixing is continued for a short period of time. In this manner a rapid binding of the surface-water is achieved and a homogeneous dry and uniformly structurized granulate is obtained without needing an aging-period. The resulting granulates exhibit a high abrasion-resistency and all advantageous properties for further use.

It is also possible to introduce the total amount of phosphate into the spray mixer at the beginning and mixing it with the alkali aluminum silicate under spraying with water.

It is also possible to admix, depending upon the contemplated use of the composition, other pulverulent components as they are customarily used in washing- and cleaning-compositions to the pulverulent mixture of an alkali metal aluminum silicate and of a polyphosphate. Such mixtures are also granulated by spraying with water, preferably in a spray mixer. In this case it is advantageous to first only mix a portion of the polymer phosphates with the alkali aluminosilicate under spraying with water and subsequently admix the remaining portion of the polymer phosphate.

For instance, alkali metal metasilicates and/or alkali metal disilicates, sodium carbonates, organic compounds which contain activated chlorine, agents capable of controlling foaming, corrosion-inhibitors, and others can be admixed as additional components to the mixtures according to the present invention before granulation. These additives do not adversely affect granulation and the abrasion-resistance of the resulting compositions.

The mixed granular compositions according to the present invention are especially suitable for use as washing, cleaning, and dish-rinsing agents or as auxiliary washing agents, for instance, as water-softening agents. They can be admixed to other components of cleaning compositions without causing any dust-formation, which is often observed with conventional alkali aluminum silicate-containing compositions.

The compositions of the present invention can be stored in simple packages or wrappings for prolonged periods of time without any decrease in their flowing ability. Aggregation or formation of lumps does not occur in the dosing-chambers of washing and dish-rinsing-machines. Thus, they can be flushed out in a satisfactory manner.

In some instances, especially when using the granulates composition in washing agents for textiles, it has proved to be of advantage to add a water-soluble surfactant which is liquid at room temperature, to the granulated composition containing the highly condensed phosphate. Without such a surfactant addition the granulates form skeletons of silicate which are somewhat larger than the silicate-particles added for granulation. Such larger silicate-particles can occasionally cause trouble on washing of textiles because the insoluble silicate-particles cannot be removed readily by rinsing the textile-fabrics. Surprisingly, it has been found that this disadvantage is not encountered when adding a small amount of certain surfactants to the washing-composition. Addition of surfactants prevents substantially completely aggregation to larger silicate agglomerates.

Preferred surfactants are nonylphenol with 5 moles to 15 moles of ethylene oxide or also types of surfactants such as poly-oxypropylene-polyoxyethylene block polymers, for instance, the products sold by the firm Wyandotte under the trademark Pluronic L 64 which is a poly-oxypropylene-polyoxyethylene addition product with 40% of polyoxyethylene of a molecular weight of 1750; or Pluronic L 92 which is a poly-oxypropylene-polyoxyethylene addition product with 20% of polyoxyethylene or a molecular weight of 2750. The effect of the added surfactant is shown in Table II as given hereinafter.

Linear alkane sulfonates, for instance, as used in Example 14 hereafter, also are suitable surfactant. Preferred are sulfonates of the formula

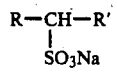

and

R-SO₃Na which are produced, for instance, by sulfoxidation of n-paraffins. R and R' in said formula indicate preferably alkyl with 12 to 18 carbon atoms. Such linear alkane sulfonates are sold, for instance, by the firm Farbwerke Hoechst AG under the trademark "HOSTAPUR".

Ethoxylated tallow fatty alcohols also are suitable tensides, for instance, the ethoxylated alcohol used in Example 13 hereafter which is sold under the trademark "GENAPOL T-110" of Farbwerke Hoechst AG.

These and other polyglycol ethers of straight chain saturated higher molecular fatty alcohols of the formula

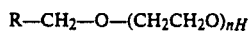

may contain between 11 and 25 moles of ethylene oxide attached to such a higher molecular fatty alcohol. Of course, other linear alkane sulfonates as well as other ethoxylated fatty alcohols may be added to the claimed compositions according to the present invention.

The surfactant-content is between about 0.5% and about 5% and preferably between about 1% and 2% calculated for the content of alkali metal aluminum silicate and total phosphate.

To produce granulates which contain surfactants, preferably the aqueous surfactant solution is sprayed upon the pulverulent mixture of the raw materials during granulation. It is, however, possible to add the surfactant to the mixture of the raw materials and to spray water subsequently thereon.

Other components as they are usually present in washing- and cleaning-agents and detergents can also be admixed to the mixture of alkali metal aluminum silicate and polyphosphates before granulating the mixture.

The present invention is illustrated more in detail by the following examples, without, however, being limited thereto.

In each of the Examples 1-14, and the Comparative Examples A-E, granulation is effected in a granulating plate device of the firm Eirich. The granulating plate has a diameter of 40 cm. and a height of 10 cm. at its edge. The device is inclined horizontally by 55°. Its number of revolution is 40 revolutions per minute.

EXAMPLE 1

125 g of substantially anhydrous, well flowable, pulverulent sodium tripolyphosphate of a phase I content of 8% and a bulk weight of 1000 g/l (as it is produced at a relatively high temperature), 320 g of zeolite type A 40 of an average particle-size of about 4μ, a loss of ignition of 22% (determined according to the specifications of DIN 55921 but by heating at 800° C. for 1 hour), and a bulk weight of 380 g/l, and 125 g of a finely pulverized, highly condensed phosphate of a phosphorous pentoxide-content of 64.5% and a bulk weight of 1100 g/l, are mixed in the dry state and introduced into the granulating plate-like device.

130 g of water are sprayed upon said mixture within 4 minutes. The resulting granulated composition is kept in the granulating plate for 20 or more minutes while continuing rotation of the plate. During granulation the temperature of the granulate adjusts itself to a temperature of about 45° C. by its inherent reaction. The resulting 625 g of the granulated composition have a granular, abrasion-resistant structure. The composition does not cake or form lumps thereafter. Its bulk weight is 770 g/l, its water-content (determined by heating at 500° C. for 30 minutes) is 20%, its phosphorous pentoxide-content is 24.5%, and its silicon dioxide-content is 16.8%.

The following mixtures are granulated in the same manner as described in Example 1.

EXAMPLE 2

500 g of zeolite, Type A 40, 15 g of a highly condensed phosphate (p₂O₅-content: 68%), 35 g of sodium tripolyphosphate, and
170 g of water.
Bulk weight of the resulting granulate: 580 g/l;
Water-content (on drying at 500° C. for 30 minutes): 27.9%;
$P_2O_5$-content: 5.1%;
$SiO_2$-content: 27.0%.

EXAMPLE 3

50 g of zeolite, Type A 40,
150 g of a highly condensed phosphate ($P_2O_5$-content: 68%),
380 g of sodium tripolyphosphate, and
70 g of water.
Bulk weight of the resulting granulate: 790 g/l;
water-content (on drying at 500° C. for 30 minutes): 7.5%;
$P_2O_5$-content: 53.2%;
$SiO_2$-content: 2.8%.

EXAMPLE 4

320 g of zeolite, Type A 40,
250 g of highly condensed phosphate ($P_2O_5$-content: 64.5%), and
110 g of water.
Bulk weight of the resulting granulate: 740 g/l;
Water-content (on drying at 500° C. for 30 minutes): 18.9%;
$P_2O_5$-content: 26.1%;
$SiO_2$-content: 17.1%.

EXAMPLE 5

A dish-rinsing composition is obtained by first producing a pulverulent mixture of
250 g of zeolite, Type A 40,
100 g of a highly condensed phosphate ($P_2O_5$-content: 64.5%),
100 g of sodium tripolyphosphate,
276 g of anhydrous pulverulent sodium metasilicate,
95 g of sodium carbonate, and
15 g of sodium dichloro isocyanurate.
The resulting pulverulent mixture is granulated as described in Example 1 by spraying thereon
150 cc of water containing dissolved therein
10 g of Malophen 85 (nonyl phenol polyglycol ether with 5 moles of ethylene oxide).
The resulting granulated composition can directly be used as dish-rinsing agent in dish-washing-machines.

EXAMPLE 6

A granulated composition is produced by granulating a mixture of
300 g of zeolite, Type A 40,
45 g of a highly condensed phosphate ($P_2O_5$-content: 64.5%), and
105 g of sodium tripolyphosphate by spraying thereon
120 g of water and otherwise proceeding as described hereinabove.

EXAMPLE 7

A granulated composition is produced by granulating a mixture of
150 g of zeolite, Type A 40,
90 g of a highly condensed phosphate ($P_2O_5$-content: 64.5%), and
210 g of sodium tripolyphosphate by spraying thereon
90 g of water and otherwise proceeding as described hereinabove.

EXAMPLE 8

A granulated composition is produced by granulating a mixture of
25 g of zeolite, Type A 40,
150 g of a highly condenzed phosphate ($P_2O_5$-content 64.5%), and
350 g of sodium tripolyphosphate by spraying thereon
70 g of water and otherwise proceeding as described hereinabove.

EXAMPLE 9

A granulated composition is produced by granulating a mixture of
500 g of zeolite, Type A 40,
7.5 g of a highly condensed phosphate ($P_2O_5$-content: 64.5%) and
17.5 g of sodium tripolyphosphate by spraying thereon
300 g of water and otherwise proceeding as described hereinabove.

EXAMPLE 10

50 g of zeolite, Type A 40,
150 g of a highly condensed sodium phosphate ($P_2O_5$-content: 68%),
350 g of potassium tripolyphosphate, and
70 g of water.
The mixture is granulated as described in Example 1.
Bulk weight of the granulated composition: 750 g/l;
Water-content (on drying at 500° C., for 30 minutes): 7.9%;
$P_2O_5$-content: 43.2%.
The highly condensed phosphate as used in Examples 1 to 9 is preferably a sodium phosphate.

EXAMPLE 11

50 g of zeolite, Type A 40,
150 g of a highly condensed potassium phosphate (medium chain length n=25; phosphorous pentoxide-content: 58.2%), and
350 g of sodium tripolyphosphate are granulated by spraying thereon
70 g of water.
Bulk weight of the granulate: 770 g/l;
Water-content (on drying at 500° C. for 30 minutes): 7.7%;
$P_2O_5$-content: 46.5%.

EXAMPLE 12

A pulverulent mixture composed of
200 g of zeolite, Type A 40,
50 g of a highly condensed sodium phosphate ($P_2O_5$-content: 68%),
150 g of sodium tripolyphosphate,
100 g of sodium disilicate,
30 g of soap,
20 g of carboxy methyl cellulose, and
0,1 g of conventional brightening agent are granulated by spraying thereon
200 g of a granulating liquid composed of
100 g of water,
70 g of Marlophen 89, and
30 g of tallow fatty alcohol ethoxylate with 11 moles of ethylene oxide.

Subsequently there are admixed to the granulate
  250 g of sodium perborate.
The resulting granulated compound is a useful washing agent.

EXAMPLE 13

200 g of zeolite, Type A 40,
  50 g of a highly condensed sodium phosphate ($P_2O_5$-content: 68%),
  150 g of sodium tripolyphosphate, and
  100 g of water
are granulated as described in Example 1 hereinabove. The resulting granulated composition is then mixed with a mixture composed of
  250 g of sodium perborate,
  100 g of sodium disilicate,
  70 g of LAS (linear alkane sulfonate),
  30 g of soap (sodium palmitate),
  30 g of a tallow fatty alcohol with 11 moles of ethylene oxide,
  20 g of carboxy methyl cellulose,
  an optional brightener, and perfume.
After drying the resulting mixture
  250 g of sodium perborate are admixed thereto on the granulating-plate.

The following granulated compositions are produced for comparison sake in an analogous manner as described in Example 1. They differ from the compositions of Examples 1 to 13 according to the present invention as stated.

COMPARATIVE EXAMPLE A

Analogous to Example 1, but without the addition of the highly condensed phosphate.
  320 g of zeolite, Type A 40,
  250 g of sodium tripolyphosphate,
  250 g of water.
Bulk weight: 660 g/l;
Water-content: (on drying at 500° C. for 30 minutes): 24.1%;
$P_2O_5$-content: 22.0%;
$SiO_2$-content: 16.0%.

COMPARATIVE EXAMPLE B

Analogous to Example A, but granulated with an aqueous solution of a highly condensed phosphate.
  320 g of zeolite, Type A 40,
  250 g of sodium tripolyphosphate,
  250 g of water containing dissolved therein
  62.5 g of a highly condensed phosphate ($P_2O_5$-content: 64.5%)
  corresponding to a 25% aqueous solution.
Bulk weight: 630 g/l;
Water-content (on drying at 500° C. for 30 minutes): 20.9%;
$P_2O_5$-content: 26.0%;
$SiO_2$-content: 14.8%.

COMPARATIVE EXAMPLE C

Analogous to Example A, but granulated with an aqueous carboxy methyl cellulose solution.
  320 g of zeolite, Type A 40,
  250 g of sodium tripolyphosphate,
  150 g of an aqueous 2% carboxy methyl cellulose solution.
Bulk weight: 670 g/l.
Water-content (on drying at 500° C. for 30 minutes): 23.1%;
$P_2O_5$-content: 22.3%;
$SiO_2$-content: 16.2%.

COMPARATIVE EXAMPLE D

Analogous to Example A, but granulated with an aqueous gum arabic solution.
  320 g of zeolite, Type A 40,
  250 g of sodium tripolyphosphate,
  250 g of an aqueous 5% gum arabic solution.
Bulk weight: 700 g/l;
Water-content (on drying at 500° C. for 30 minutes): 26.7%;
$P_2O_5$-content: 2.3%;
$SiO_2$-content: 15.4%.

COMPARATIVE EXAMPLE E

Analogous to Example 12, but without the addition of the highly condensed phosphate.
  250 g of zeolite, Type A 40,
  20 g of sodium tripolyphosphate,
  276 g of anhydrous, pulverulent sodium metasilicate,
  95 g of sodium carbonate,
  15 g of sodium dichloro iosyanurate,
  190 g of water.

The high effectiveness and superior properties of the granulated compositions according to the present invention over the compositions of the comparative examples is demonstrated by the tests described hereinafter. The comparison of said compositions is based on their resistance to abrasion. To carry out said abrasion-resistance test the distribution of the particle-sizes of the granulated compositions is determined before and after a treatment of the granulates with freely movable nylon-brushes to achieve increased mechanical abrasion during screening. Additionally, the flowability and the capability of being flushed out of the samples is determined.

(1) Abrasion-resistance:

I. Determination of the distribution of the particle sizes of the granulates by screening analysis.

For carrying out the test, 100 g of the sample to be tested are weighed exactly and are placed upon a screen of the greatest width of mesh, i.e. of 1000μ of a standardized test screening set according to DIN 4188. After screening the sample on a vibration machine with a force-controlled three-dimensional movement of the screen for five (5) minutes, the resulting screened fractions are weighed. The residues of the sample on the various screens are weighed cumulatively, i.e., the residue on each screen is weighed in each instance only after it was combined with the subsequently screened finer residue.

II. Abrasion-resistance test

After the first screen analysis test has been completed, the entire sample is again subjected to a second screen analysis test whereby movable nylon-brushes are caused to act on all screens. The abrasion-resistance is determined by directly comparing the first analysis test results with those of the second screen analysis test.

The following Table 1 shows the results in percent obtained on a screen analysis according to DIN 4188. The values under I are those obtained by the first screen analysis test without testing for abrasion while the values under II are those obtained by the second screen analysis test with testing for abrasion (by means of the nylon-brushes).

TABLE I

| EXAMPLE | 1000μ I | 1000μ II | 500μ I | 500μ II | 125μ I | 125μ II | <125μ I | <125μ II |
|---|---|---|---|---|---|---|---|---|
| 1 | 11.7 | 9.9 | 47.0 | 46.6 | 98.7 | 98.9 | 1.3 | 1.1 |
| 2 | 13.2 | 9.8 | 39.6 | 24.3 | 94.8 | 89.3 | 5.2 | 11.7 |
| 3 | 26.9 | 25.2 | 78.9 | 78.9 | 98.3 | 97.8 | 1.7 | 2.2 |
| 4 | 23.6 | 21.9 | 69.7 | 69.2 | 99.1 | 98.5 | 0.9 | 1.5 |
| 5 | 21.9 | 21.1 | 75.8 | 73.9 | 95.7 | 95.5 | 4.3 | 4.5 |
| 6 | 28.6 | 27.3 | 79.8 | 72.2 | 95.9 | 95.4 | 4.1 | 4.6 |
| 7 | 24.3 | 24.1 | 73.9 | 72.3 | 98.5 | 98.3 | 1.5 | 1.7 |
| 8 | 25.3 | 25.2 | 71.5 | 70.9 | 98.2 | 97.9 | 1.8 | 2.1 |
| 9 | 14.9 | 4.6 | 80.2 | 58.6 | 93.7 | 89.3 | 6.3 | 11.7 |
| 10 | 24.0 | 22.0 | 75.0 | 76.5 | 99.0 | 98.5 | 1.0 | 1.5 |
| 11 | 21.5 | 20.6 | 76.8 | 76.6 | 98.3 | 97.2 | 1.7 | 2.8 |
| Comparative Examples | 1000μ I | 1000μ II | 500μ I | 500μ II | 125μ I | 125μ II | <125μ I | <125μ II |
| A | 35.1 | 0.9 | 72.5 | 57.5 | 97.2 | 93.5 | 2.8 | 6.5 |
| B | 16.0 | 0.5 | 66.0 | 20.5 | 96.8 | 86.0 | 3.2 | 14.0 |
| C | 43.3 | 0.6 | 83.3 | 11.1 | 98.7 | 84.3 | 1.3 | 15.7 |
| D | 8.1 | 0.0 | 60.1 | 2.7 | 95.6 | 78.5 | 4.4 | 21.5 |
| E | 14.7 | 8.2 | 69.9 | 49.1 | 98.3 | 94.3 | 1.7 | 5.7 |

The excellent abrasion resistance of the granulated compositions of Examples 1 to 11 according to the present invention compared with that of the granulated compositions obtained according to the comparative examples A to E is clearly evident from the exceptional preservation of the granulate structure in the second screen analysis test.

A screen analysis was not carried out with the compositions of Examples 12 and 13 because the structure of the perborate contained therein is of some importance in this case and affects the results.

(2) Flowability

The flowability of granulated compositions containing highly condensed phosphates offers many problems as this is well known. See, for instance, German Offenlegungsschrift No. 2,606,684. In said application the glassy phosphates are protected against contact with other components by a specific organic film. The granulates obtained according to the examples given hereinabove which are characterized by a content of highly condensed phosphate, do not have the disadvantages pointed out in said application. They can be packed immediately after granulation. They exhibit an excellent flowability even after a storage time of three months when packed and sealed in conventional folding cartons.

(3) Test for its ability of being flushed out

The granulated compositions of the following standard composition are used as dish-washing agents in dish-washing-machines. Such a standard composition contains:
- 45% of the granulated composition according to the present invention,
- 51% of anhydrous sodium metasilicate Type Simet AN (of the firm Sifrance, Paris),
- 2% of the surfactant known by the trademark Plurafac RA 40 which is a straight chain hydroxy ethylated alcohol (of the firm Kuhlmann, France), and
- 2% of sodium dichloro isocyanurate.

Such compositions are tested for their behavior of being flushed out of the dosing-device of an automatic dish-washing-machine. 40 g of the rinsing-agent are used in said test. In each case it is found that the granulated rinsing-agent according to the present invention shows excellent flushing-out times, i.e. they are completely flushed out within two to three minutes.

EXAMPLE 14—Surfactant containing compositions:

In an analogous manner as described in Example 1 there are produced granulated compositions as follows:
- 320 g of zeolite, Type A 40,
- 75 g of a highly condensed phosphate ($P_2O_5$-content: 64.5%),
- 175 g of sodium tripolyphosphate, and
- 150 g of water to which in each instance 8.5 g of the respective surfactant was added. The surfactant amount added corresponds to 1.5%, calculated for the mixture of alkali metal aluminum silicate and total phosphate.

5 g of each granulate are stirred in 150 cc of water for 5 minutes. The mixture is allowed to settle for 10 minutes. Thereafter, the residue is microscopically examined and the structure of the zeolite is compared with the structure of the starting zeolite Type A 40.

The results are given in Table II as indicated by the following numerals:
1—Grain structure of the zeolite type remained practically unchanged.
2—Slight enlargement of the zeolite particles.
3—Medium enlargement of the zeolite particles.
4—Considerable enlargement of the zeolite particles.

TABLE II

| No. of Experiment | Surfactant | State of Aggregation | Result |
|---|---|---|---|
| 14.1 | Marlophen 89 | liquid | 1 |
| 14.2 | Marlophen 85 | liquid | 1 |
| 14.3 | Pluronic L92 | liquid | 2 |
| 14.4 | Pluronic L64 | liquid | 2 |
| 14.5 | Pluronic F68 | solid | 4 |
| 14.6 | Marlon A350 | solid | 4 |

In these tests the following surfactants are used:
Marlophen 89: Nonylphenol polyglycol ether with 9 ethoxy groups.
Marlophen 85: Nonylphenol polyglycol ether with 5 ethoxy groups.
Pluronic L92: Polyoxy propylene-polyoxy ethylene adduct with 20% of polyoxyethylene.
Pluronic L64: Polyoxy propylene-polyoxy ethylene adduct with 40% of polyoxyethylene
Pluronic F68: Polyoxy propylene-polyoxy ethylene adduct with 80% of polyoxyethylene.
Marlon A35: Sodium salt of dodecyl benzene sulfonic acid 50%.

The results of Table II show that formation of silicate skeletons does not take place on addition of liquid surfactants, i.e. only a slight enlargement of the zeolite particles or none at all is observed. Solid surfactants are not suitable since they cause considerable enlargement of the zeolite particles.

EXAMPLE 15

105.0 kg of a phosphate mixture containing 75 parts by weight of highly condensed phosphate ($P_2O_5$-content 68%) and 15 parts by weight of sodium tripolyphosphate, which mixture has been pre-treated with watervapor, and 245.0 kg of alkali aluminosilicate (zeolite A 40) are introduced into a spraying mixer having a filling capacity of 1 ton and are sprayed with 40 l of water. Subsequently, an additional 105 kg of the same vapor-pre-treated phosphate mixture are introduced into the mixer and mixing is continued for another 5 minutes.

EXAMPLE 16

As described in Example 15, 135.0 kg of highly condensed phosphate ($P_2O_5$-content 64%), 230.0 kg of alkali aluminosilicate (zeolite A 40), and 135.0 kg of sodium tripolyphosphate (spray-phosphate of the type S 400 having a phase I content of 10%, manufacturer Knapsack AG) are introduced into a spray mixer and sprayed with 50 l of water.

EXAMPLE 17

125.0 kg of alkali aluminosilicate (zeolite A 40), and 112.5 kg of highly condensed phosphate ($P_2O_5$-content 68%) which has been pre-treated with water-vapor, are introduced into a spray mixer and sprayed with 50 l of water. Subsequently, 112 kg of sodium tripolyphosphate (spray-phosphate of the type thermphos L 50 having a phase I content of 50%, manufacturer Knapsack AG) is introduced into the mixer and mixed with the sprayed material.

EXAMPLE 18

For preparing a granulated dishwashing detergent for use in dishwashing machines, 50.0 kg of a phosphate mixture containing 60 parts by weight of highly condensed phosphate ($P_2O_5$-content 68%) and 40 parts by weight of sodium tripolyphosphate which has been pre-treated with water-vapor, 100.0 kg of alkali aluminosilicate (zeolite A 40), 100.0 kg pulverulent anhydrous sodium metasilicate, 42.5 kg of sodium carbonate, and 7.5 kg of potassium dichloroisocyanurate are introduced into a spray mixer and sprayed with 50 l of water containing dissolved therein 5 kg of nonyl phenol polyethyleneglycol ether containing 5 ethylenoxy units per molecule. Subsequently, 150 kg of the same vapor-pre-treated phosphate mixture is added to the composition and mixed therewith.

EXAMPLE 19

For preparing a granulated detergent, 100.0 kg of partially hydrated sodium tripolyphosphate (sprayphosphate of the type thermphos N having a phase I content of 10%, manufacturer Knapsack AG), 200.0 kg of alkali aluminosilicate (zeolite A 40), 50 kg of sodium disilicate, 250.0 kg of sodium perborate, 100 kg of a surfactant mixture (containing 70% of sodium salt of dodecyl benzenesulfonic acid, 90% purity (commercial product Marlon A 390, manufacturer Huels AG) and 30% of a tallow soap (sodium salt of $C_{18}$-fatty acids)) and 20.0 kg of carboxymethylcellulose are introduced into a spray mixer and sprayed with 80 kg of water. Subsequently, 100 kg of sodium tripolyphosphate (spray-phosphate of the type thermphos L 50 having a phase I content of 50%) and 100 kg of sodium phosphate are added to the mixture and mixed therewith.

In all the examples, 15–19, free-flowing products are obtained. No after-treatment for achieving a satisfactory flowability is necessary.

EXAMPLE 20

7.5 kg of anhydrous highly condensed phosphate ($P_2O_5$-content 68%), 1.5 kg of anhydrous sodium tripolyphosphate, and 10.5 kg of alkali aluminosilicate (zeolite A 40) are introduced into a spray mixer and sprayed with 1.95 kg of water.

The water is sprayed onto the mixture during the mixing process in the spray mixer within a period of 10 minutes. After an aging-period of 30 minutes at a temperature of 50° C., the resulting granulate is abrasionresistant and free-flowing and does not have any caking tendency, even after a prolonged storage period.

The abrasion-resistance of the compositions obtained in Examples 15–20, has been determined according to the procedure described on page 21. The results are given in Table III below.

TABLE III

| EXAM-PLE | SCREEN-ANALYSIS ACCORDING TO DIN 4188 | | | | | | | |
|---|---|---|---|---|---|---|---|---|
| | 1000 micron | | 500 micron | | 125 micron | | 125 micron | |
| | I | II | I | II | I | II | I | II |
| 15 | 19.8 | 16.3 | 60.3 | 59.8 | 97.6 | 97.1 | 2.4 | 2.9 |
| 16 | 17.6 | 14.2 | 64.9 | 64.8 | 97.2 | 96.4 | 2.8 | 3.6 |
| 17 | 14.3 | 11.3 | 68.7 | 66.4 | 97 | 95.9 | 3.0 | 4.1 |
| 18 | 24.9 | 22.1 | 59.6 | 57.3 | 98.4 | 97.3 | 1.6 | 2.7 |
| 19 | 12.5 | 10.3 | 70.5 | 68.7 | 97.9 | 96.9 | 2.1 | 3.1 |
| 20 | 18.0 | 15.6 | 69.8 | 66.2 | 98.1 | 97.2 | 1.9 | 2.8 |

I = 1. Screen-analysis without abrasion testing.
II = 2. Screen-analysis after abrasion testing (by means of nylon brushes).

Although the sodium salts of the highly condensed phosphates are the preferred alkali metal salts of such compounds, the potassium salts, ammonium salts, and other alkali metal salts of said highly condensed phosphates can also be used.

As stated above, the substantially water-insoluble alkali metal aluminum silicate can at least partly be replaced by the alkali metal boron silicates of the formula as given hereinabove. The preparation of such substantially water-insoluble alkali metal boron or aluminum silicates is described in the above-mentioned German Offenlegungsschrifts Nos. 2,412,837 and 2,510,741.

Of course many changes and variations in the composition of the granulates according to the present invention, in the process of producing same, in the addition of other conventional additives to such compositions, in their use as washing, rinsing, and cleaning agents, as agents for softening water, as washing agents for textile materials, and the like, may be made by those skilled in this art in accordance with the principles set forth herein and in the claims annexed hereto.

What is claimed is:

1. A process of producing an agglomerated composition comprising granulating a pulverulent mixture comprising an ion-exchanging alkali metal aluminum silicate and a polymer phosphate comprising from 5 to 100 weight percent highly condensed polymer phosphates of the formula:

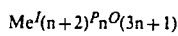

$$Me^I{}_{(n+2)}P_nO_{(3n+1)}$$

wherein Me represents an alkali metal and n is an integer from 4 to about 50 and from 95 to 0 weight percent alkali tripolyphosphate, by spraying said mixture with water in a spray mixer or a rotary tubular mixer, the weight ratio of polymer phosphate to alkali metal aluminum silicate in said mixture being from 1:20 to 20:1.

2. The process of claim 1, wherein said pulverulent mixture further comprises an effective amount of at least one of the following additives: anionic surfactants, active oxygen-containing compounds, optical brighteners, alkali metal metasilicates, alkali metal disilicates, sodium carbonates, active chlorine-containing organic compounds, foam-inhibiting agents, corrosion-inhibiting agents and mixtures thereof.

3. The process of claim 2, wherein the weight ratio of polymer phosphate to alkali metal aluminum silicate in said mixture is from 1:2 to 2:1.

4. The process according to claim 1, wherein said polymer phosphate comprises from 20 to 100 weight percent of said highly condensed phosphate and from 80 to 0 weight percent alkali tripolyphosphate.

5. The process of claim 1, wherein the water sprayed upon the pulverulent mixture contains a water-soluble surfactant in an amount corresponding to from 1 to 2 weight percent of the combined alkali metal aluminum silicate and polymer phosphate content of the mixture, said surfactant being a liquid at room temperature.

6. A process according to claim 1, wherein said spray mixer or said rotary tubular mixer is horizontally positioned.

7. The process of claim 1, wherein the granulating device is a spray mixer.

8. The process of claim 1, wherein the polymer phosphate comprises a mixture of the highly condensed phosphate and alkali tripolyphosphate.

9. The process of claim 1, wherein at least part of the polymer phosphate is a phosphate which has been pretreated with water-vapor.

10. The process of claim 8, wherein at least part of the alkali tripolyphosphate is a partially hydrated tripolyphosphate.

11. The process of claim 8, wherein at least part of the alkali tripolyphosphate is a tripolyphosphate having a phase I content of at least 10%.

12. The process of claim 8, wherein the alkali tripolyphosphate is a spray-dried tripolyphosphate.

13. The process of claim 8, wherein the polymer phosphate is a mixture of various forms of phosphates.

* * * * *